United States Patent
Lambeaux et al.

[19]

[11] Patent Number: 6,017,001
[45] Date of Patent: Jan. 25, 2000

[54] CONTROLLING ROTATION OF A SPACECRAFT

[75] Inventors: Olivier Lambeaux, Tournefeuille; Bernard Polle, Saint Orens de Gameville, both of France

[73] Assignee: Matra Marconi Space France SA, Paris, France

[21] Appl. No.: 08/854,812

[22] Filed: May 12, 1997

[30] Foreign Application Priority Data

May 17, 1996 [FR] France .................................. 96 06162

[51] Int. Cl.[7] ...................................................... B64G 1/26
[52] U.S. Cl. ............................ 244/169; 701/13; 244/171
[58] Field of Search ................................. 244/169, 171, 244/173, 158 R, 164; 701/13

[56] References Cited

U.S. PATENT DOCUMENTS

| 4,728,061 | 3/1988 | Johnson et al. ......................... 244/173 |
| 5,020,744 | 6/1991 | Schwarzschild . |
| 5,458,300 | 10/1995 | Flament et al. . |
| 5,788,188 | 8/1998 | Damilano ............................... 244/173 |

FOREIGN PATENT DOCUMENTS

| 0174715 A2 | 3/1986 | European Pat. Off. . |
| 0209429 A1 | 1/1987 | European Pat. Off. . |
| 0461394 A1 | 12/1991 | European Pat. Off. . |
| 0603058 A1 | 6/1994 | European Pat. Off. . |

OTHER PUBLICATIONS

"Attitude Acquisition System for Communication Spacecraft", M. Schwarzschild et. al., 169a Journal of Guidance, Control and Dynamics, 14(1991) May/Jun., No. 3, Washington, D.C. U.S., pp. 543–547.

*Primary Examiner*—Galen L. Barefoot
*Attorney, Agent, or Firm*—Venable; Robert J. Frank; Allen Wood

[57] ABSTRACT

An earth orbiting satellite is enabled to assume a "survival mode" of operation in which its x axis is aligned with the sun by observing characteristics of the movement of the frame of the satellite (e.g. its x axis) relative to the sun and performing calculations based on those operations. A more accurate result is achieved if a deliberate offset is introduced between the mean direction of the x axis and the sun's direction. The control arrangement for positioning the x axis with this offset is preferably adaptive, resulting in control of the satellite's thrusters so as to produce oscillation of the x axis in a way which allows suitable measurements to be taken.

7 Claims, 5 Drawing Sheets

NORMAL OPERATION

SURVIVAL MODE

CONTROLLING ROTATION OF A SPACECRAFT

BACKGROUND OF THE INVENTION

This invention relates to apparatus for the control of spacecraft, and more particularly to a technique for controlling the rotation of the spacecraft.

The invention arose when considering problems associated with the control of a geostationary satellite when it is in its so-called "survival mode", which will be explained later. However the invention could possibly be of value more generally in connection with spacecraft control.

In order to understand the background of the invention it is convenient to refer to FIG. 1 which shows a geostationary satellite in very schematic form. An earth sensor 1, e.g. a camera for viewing the earth, faces in the z direction and pairs of thrusters X+, X−; Y+, Y− and Z+, Z− adjust rotation of the satellite about respective axes. Sun sensors 2 (only one shown) on opposite sides of the satellite provide output signals indicating the direction of the sun relative to the x, y and z axes.

In normal operation of the satellite, as shown in FIG. 2, the z axis is always aligned with the earth, the y axis is parallel with the earth's axis and the x axis makes a tangent with the geostationary orbit. With the satellite stabilized in this way, it is possible to drive solar panels 3 relative to the body of the satellite so that these solar panels 3 remain facing in the direction of the sun as indicated by signals from sun sensors 2.

The field of view of the earth sensor 1 is usually quite narrow since the earth subtends only a small angle at the satellite. For this reason, if the earth is lost from the field of view, it can be difficult to adjust the attitude of the satellite to retrieve it. Unless remedial action is taken, the satellite will quickly fail because the reference direction from which the solar panels 3 are steered to face the sun has been lost and the supply of adequate electrical power will therefore discontinue.

Some satellites have a system which puts the satellite into a "survival" mode if the earth is lost from the field of view of the earth sensor 1. When this survival mode is initiated signals from sun sensors 2 are used to control thrusters Y+, Y− and Z+, Z− so as to align the satellite's x axis with the direction of the sun as shown in FIG. 3. The x axis now provides a new reference direction making it possible to control the satellite's solar panels 3 so that they face the sun, thereby providing the power necessary for the satellite to survive. When the satellite is in this survival mode, intervention can be taken from the ground to retrieve the earth into the field of view of the earth sensor 1.

The time that the survival mode could be maintained would be limited if there were no way of controlling the rate of rotation about the x axis. The conventional way to control rotation about the x axis is to use a gyroscope to sense the rotation and to operate thrusters X+ and X− to control it. However, such a gyroscope needs to be reliable over the entire life of the spacecraft and gyroscopes having this degree of long-term reliability are costly. The invention arose when considering possible solutions to this problem.

SUMMARY OF THE INVENTION

When the satellite is in its survival mode, the x axis will gradually drift out of alignment with the direction of the sun. When the direction of the sun makes an angle of $-\theta$ with the x y plane the thruster Y+ is fired causing reversal of the drift until the direction of the sun makes an angle of $+\theta$ with the x y plane whereupon the thruster Y− is fired. This process is repeated, resulting in oscillation of the satellite about the y axis relative to the direction of the sun as shown in FIG. 4A. A similar oscillation occurs about the z axis caused by alternate firing of thrusters Z+ and Z− when the direction of the sun drifts to an angle of $-\theta$ or $+\theta$.

The straight-line characteristic of the movement depicted in FIG. 4A assumes that there is no rotation about the x axis. If there is a rotation about the x axis the rate of change of $\theta$ with respect to time is not constant between operations of the thrusters, this leading to situations as shown in FIGS. 4A, 4B or 4C. Note that in the situations shown in FIGS. 4C and 4D, only one thruster operates, but relatively frequently, and the range of variation of $\theta$ is relatively small.

The inventors have realised that the characteristics (more particularly the first and second derivatives with respect to time) of the relative movement between the direction of the sun and the x axis of the satellite (as depicted in FIGS. 4A–4D for example) can be used to measure rotation of the satellite about the x axis.

The measurements as described above can be made more accurately in situations as shown in FIGS. 4A and 4B for example where variation of angle $\theta$ is a maximum and where the number of thruster firings is a minimum. It is important that the number of thruster firings be minimised because it is impossible to take measurements of derivatives and second derivatives during a period $d_1$ whilst a thruster is firing and during a short period $d_2$ immediately after such operation when the satellite is subject to vibration. Thus there are periods, shown by the cross-hatched areas of FIGS. 4A–4D, when measurements are inhibited.

If the window of 2θ depicted in FIGS. 4A–4D is displaced from the direction of the sun, e.g. by 10°, the characteristic shape is more predictable because it is less subject to changes arising from inaccuracies in measurement of the inertia of the spacecraft. It is therefore preferable to arrange for the thrusters Y−, Y+ and Z−, Z+ to be controlled so as to produce such an angular offset.

The rotation of the satellite about the direction of the sun can be derived mathematically as follows.

The equations governing the movements of the sun as viewed by the satellite's sun sensors are:

$$I\dot{\vec{\omega}} = I\vec{\omega} \times \vec{\omega} \qquad \text{Eq 1}$$

where $I$ is the moment of inertia of the spacecraft about its x axis and $\vec{\omega}$ is the rotation vector of the sun; and $$\dot{\vec{S}} = \vec{S} \times \vec{\omega} \qquad \text{Eq 2}$$

where $\vec{S}$ is the vector defining the sun's direction.

Assuming perfect control, $\vec{S}$ is parallel with $\vec{\omega}$ and $$\tau = \vec{\omega} \times I\vec{\omega}$$

where $\tau$ is the torque applied by the satellite's thrusters.

To analyse the system, speed of rotation of the sun is usefully expressed in terms of the sun's direction vector.

$$\vec{\omega} = (\vec{\omega} \cdot \vec{S})\vec{S} + (\vec{S} \times \vec{\omega}) \times \vec{S} \qquad \text{Eq 3}$$

The expression $\vec{\omega} \cdot \vec{S}$ is a projection of $\vec{\omega}$ on $\vec{S}$ which is defined as $\omega_s$.

Assuming perfect control, $$\tau = \omega_s^2 \vec{S} \times I\vec{S} \qquad \text{Eq 4}$$

Assuming that $\vec{S} \times I\vec{S}$ is not zero, the torque $\tau$ applied by the control therefore provides a measure of the square of the speed of rotation about the sun's vector $\vec{S}$ (but not the sign i.e. direction of the speed of rotation).

It is known that when the axis of rotation (i.e. the direction of $\vec{\omega}$) is displaced from the direction of the sun (i.e. the direction of $\vec{S}$), the sun, as viewed from the satellite's sun sensors, describes circles of which the rotation direction is a function of the sign of $\omega_s$ as shown in FIG. 7.

FIG. 7 shows the behaviour observed when $\omega$ is aligned with the maximum or minimum principal axis of inertia. In a real case, the motion is more complex due to the nutation of $\vec{\omega}$ vector but it shows that it is possible to identify the sign of $\vec{\omega}$ by observing the curvature of the movement and this principle makes it possible to avoid the need for a gyroscope in the survival mode.

In order to measure speed of rotation by observing the movement of the sun, it is preferable that the sun should be as far removed as possible from the speed vector. To achieve that the limit cycle must be wide. This is achieved by adaptive control. The controllers on both Y and Z axis are simple uncoupled controllers with torque estimator. The torque estimation is used to continuously modify the controller parameters in order to achieve a limit cycle as shown in FIG. 4A or 4B.

The movement of the sun must have a low sensitivity to the uncertainties on the satellite inertia matrix. On a typical telecommunication spacecraft as shown in FIG. 1, the minimum principal of axis of inertia is close to the Y axis and the two others in the close to the X/Z plane. The nutation motion is strongly driven by the minimum axis of inertia since the two others are generally close due to the "pen shape" of the spacecraft. The main uncertainty of the inertia matrix is to know where is the minimum axis of inertia with respect to the Y axis. Typically, a small bending of the solar array will move the principal axis away from Y by about the same angle as the bending angle. In order to be less sensitive to this uncertainty, a strong bias (typically 10°) around the Z axis is required. By this way the sun and rate vector are kept far from the X/Z plane and the motion of sun vector is mainly driven by the bias (10°) and less sensitive to uncertainties.

This bias also improves the observability of the square of the rate using equation 4.

The reason why this bias gives the desired effect can be explained as follows. The principle is to observe the first and second derivatives of the sun vector and based on the knowledge of the inertia matrix to solve equations 8 and 9, below. If a small change in the inertia matrix can considerably modify the values of the measurements, it is likely that the solution will be wrong. So it is essential that the uncertainties will not change significantly the motion of the sun. By applying a bias of 10° where the uncertainty due to bending is typically less than 1°, the motion of the sun is mainly driven by this bias. If the real bias is 11 or 9° due to bending of solar arrays, the motion is only slightly modified and in consequence, solving equations 8 and 9 will give a relatively good estimate.

Secondary derivatives of the sun's vector are used for information concerning the type of curvature.

From equation 2:

$$\ddot{\vec{S}} = \dot{\vec{S}} \times \vec{\omega} + \vec{S} \times \dot{\vec{\omega}} \qquad \text{Eq 5}$$

Equation 3 is then expressed in the following form:

$$\vec{\omega} = \omega_s \vec{S} + \dot{\vec{S}} \times \vec{S} \qquad \text{Eq 6}$$
$$\vec{\omega} = \omega_s \vec{S} + \vec{\omega}_0$$

And $\dot{\vec{\omega}}$ is calculated from equation 1 as follows:

$$\dot{\vec{\omega}} = I^{-1}\left(\omega_s^2 I\vec{S} \times \vec{S} + \omega_s(I\vec{\omega}_0 \times \vec{S} + I\vec{S} \times \vec{\omega}_0) + (I\vec{\omega}_0 \times \vec{\omega}_0)\right) \qquad \text{Eq 7}$$

$$\dot{\vec{\omega}} = \omega_s^2 \vec{x}_2 + \omega_s \vec{x}_1 + \vec{x}_0$$

This allows an equation of the following type to be obtained:

$$\ddot{\vec{S}} = \vec{a}\omega_s^2 + \vec{b}\omega_s + \vec{c} = \begin{vmatrix} - \\ a_y \omega_s^2 + b_y \omega_s + c_y \\ a_z \omega_s^2 + b_z \omega_s + c_z \end{vmatrix} \qquad \text{Eq 8}$$

$$\text{where: } \vec{a} = \vec{S} \times \vec{x}_2 \qquad \text{Eq 9}$$
$$\vec{b} = \vec{S} \times \vec{x}_1 + \vec{\omega}_0$$
$$\vec{c} = \vec{S} \times \vec{x}_0 + \dot{\vec{S}} \times \vec{\omega}_0$$

This system of two equations with two unknowns allows $\omega_s$ to be calculated.

BRIEF DESCRIPTION OF THE DRAWINGS

One way in which the invention may be performed will now be described, by way of example, with reference to the accompanying drawings, in which.

DESCRIPTION OF THE PREFERRED EMBODIMENT

In what follows, familiarity with the foregoing "Background of the Invention" and "Summary of the Invention" sections of this document will be assumed.

Figure 5:
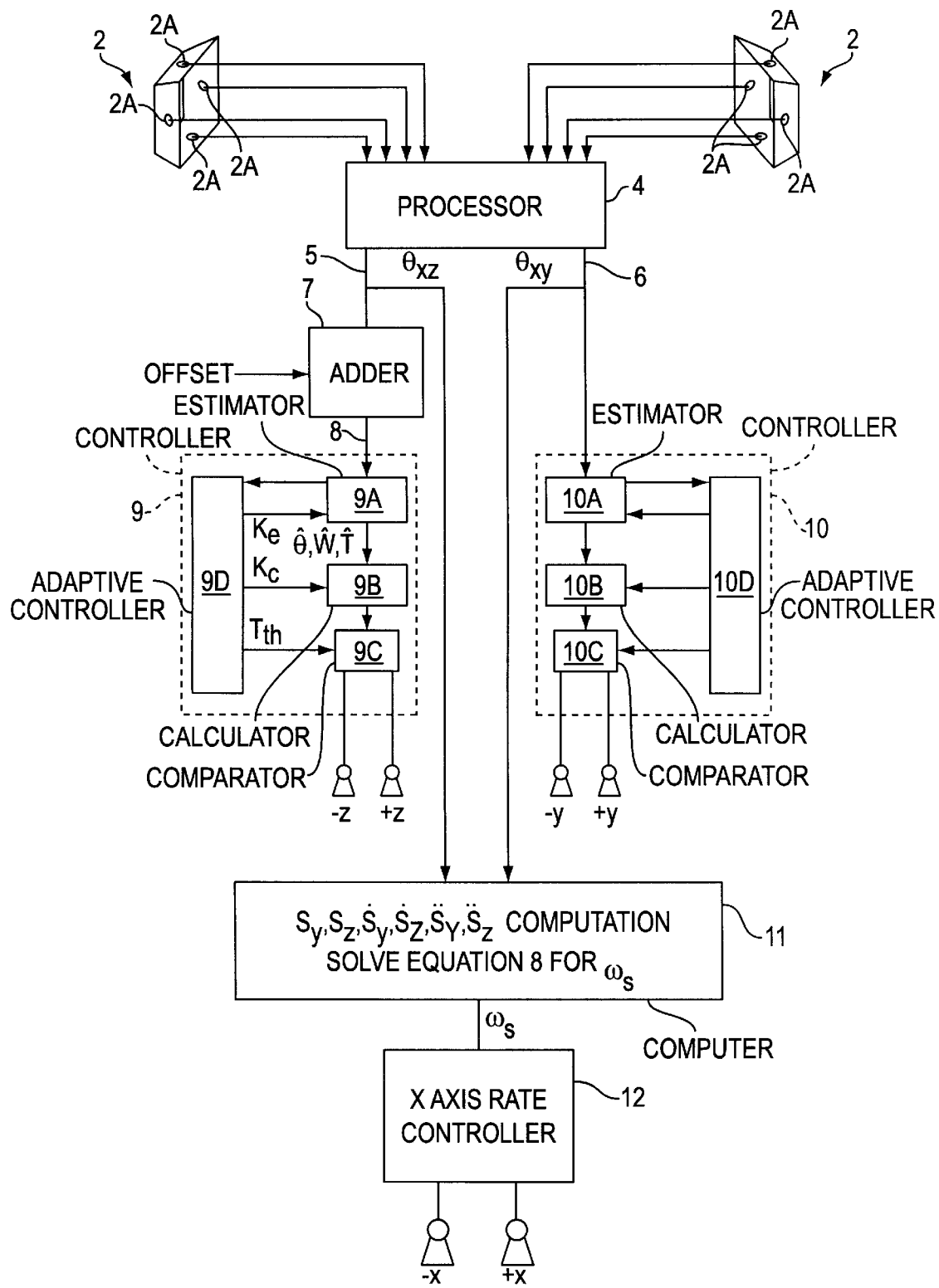
FIG. 5 is a schematic illustration showing the principles by which the various thrusters shown on FIG. 1 are controlled in accordance with signals received from sun sensors on the satellite.
Figure 6:
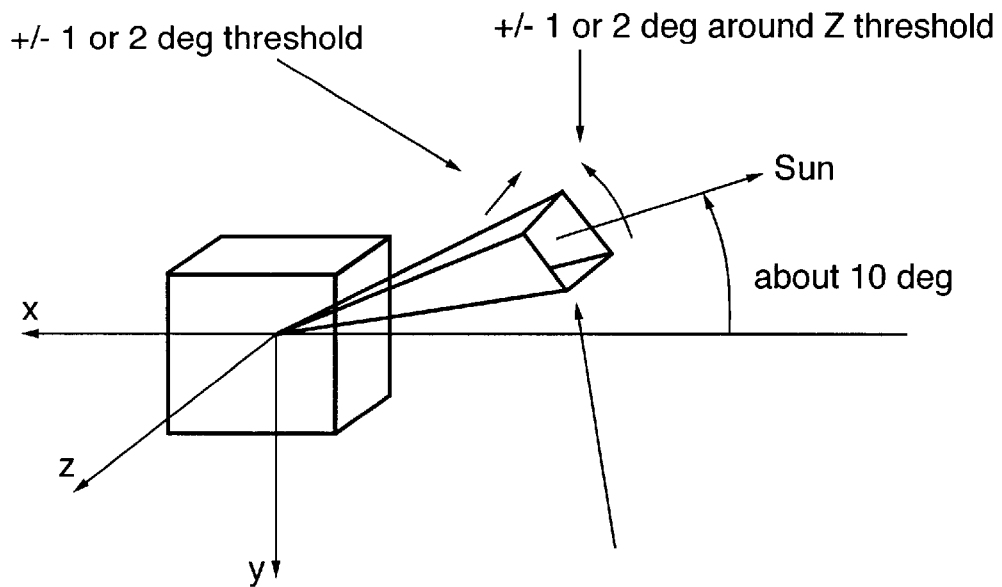
FIG. 6 illustrates how the system of FIG. 5 stabilizes the satellite's x axis at about ten degrees from the direction of the sun.
Figure 7:
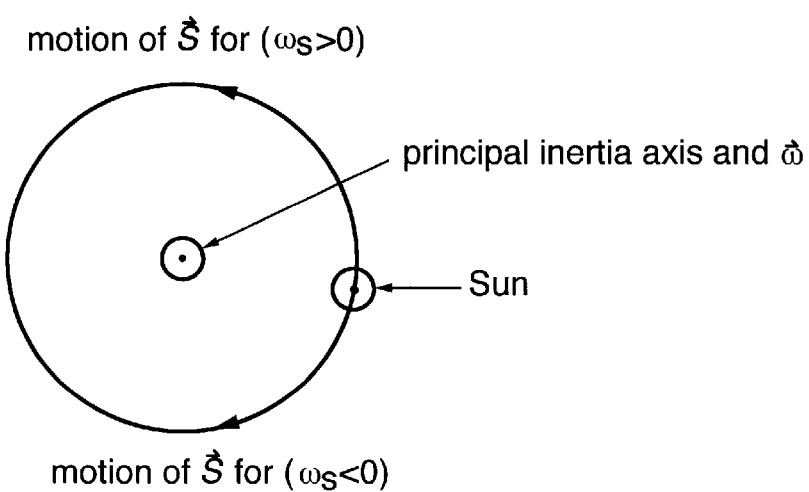
FIG. 7 shows circular rotation of the sun as viewed from the satellite.

Referring in particular to FIG. 5, this shows two sun sensors 2 each having four photodiodes 2A. The outputs of the photodiodes are fed to a processor 4 which produces outputs 5 and 6 indicating the angle $\theta_{xz}$ and $\theta_{xy}$ between the x axis and the projection of the sun's vector onto the x z and x y planes respectively. These are the angles through which the satellite needs to be turned about the y and z axes to align the x axis with the sun. The angle represented by the signal on line 5 is added at 7 to an offset angle typically of ten degrees and the resulting signal on line 8 is applied to a controller 9 which controls the −Z and +Z thrusters. An independent controller 10, controlling thrusters −Y and +Y, is identical to controller 9 and will therefore not be described.

Controller 9 comprises an estimator 9A based on LQG controllers. The equation of the estimator is:

$$\frac{d}{dt}\begin{bmatrix}\hat{\theta}\\\hat{\omega}\\\hat{T}\end{bmatrix}=\begin{bmatrix}0 & 1 & 0\\0 & 0 & 1/I\\0 & 0 & 0\end{bmatrix}\begin{bmatrix}\hat{\theta}\\\hat{\omega}\\\hat{T}\end{bmatrix}+\begin{bmatrix}0\\\frac{1}{I}\\0\end{bmatrix}T_a+K_e(\hat{\theta}-\theta)$$

where $\theta$, $\omega$, T represent angle, rate and external torque respectively, these symbols being shown with a ^ to denote their estimated values. $T_a$ is the torque applied by the thrusters, T is the external torque applied on the z axis and I is the satellite inertia on the z axis. An additional integral term can be added to reduce static errors.

The two first parts of the right-hand side of the equation represent the model prediction, the first being the prediction without control and the second the impact of the thruster's control torque. The third part of the equation represents the estimator updating based on a comparison between the angle prediction $\hat{\theta}$ and the measurement $\theta$.

The estimated values of $\hat{\theta}$, $\hat{\omega}$ and $\hat{T}$ are passed from estimator 9A to a calculator 9B where they are used at to calculate the torque to be applied by the thrusters. This is done by simple multiplication by value $K_c$.

$$T_c=K_c\begin{bmatrix}\hat{\theta}\\\hat{\omega}\\\hat{T}\end{bmatrix}$$

Finally the output from 9B, representing the required torque, is compared at 9C with a threshold ($T_{th}$) to avoid giving too small pulses. The torque at the output of the threshold $T_a$ (applied torque) is fed back in the estimator 9A to take into account control activity.

An adaptive controller 9D serves to modify slowly all the control parameters: $K_e$, $K_c$, $T_{th}$ as a function of $\hat{T}$ (which it receives from estimator 9A) in order to achieve the limit cycle of FIG. 4B.

Figure 1:
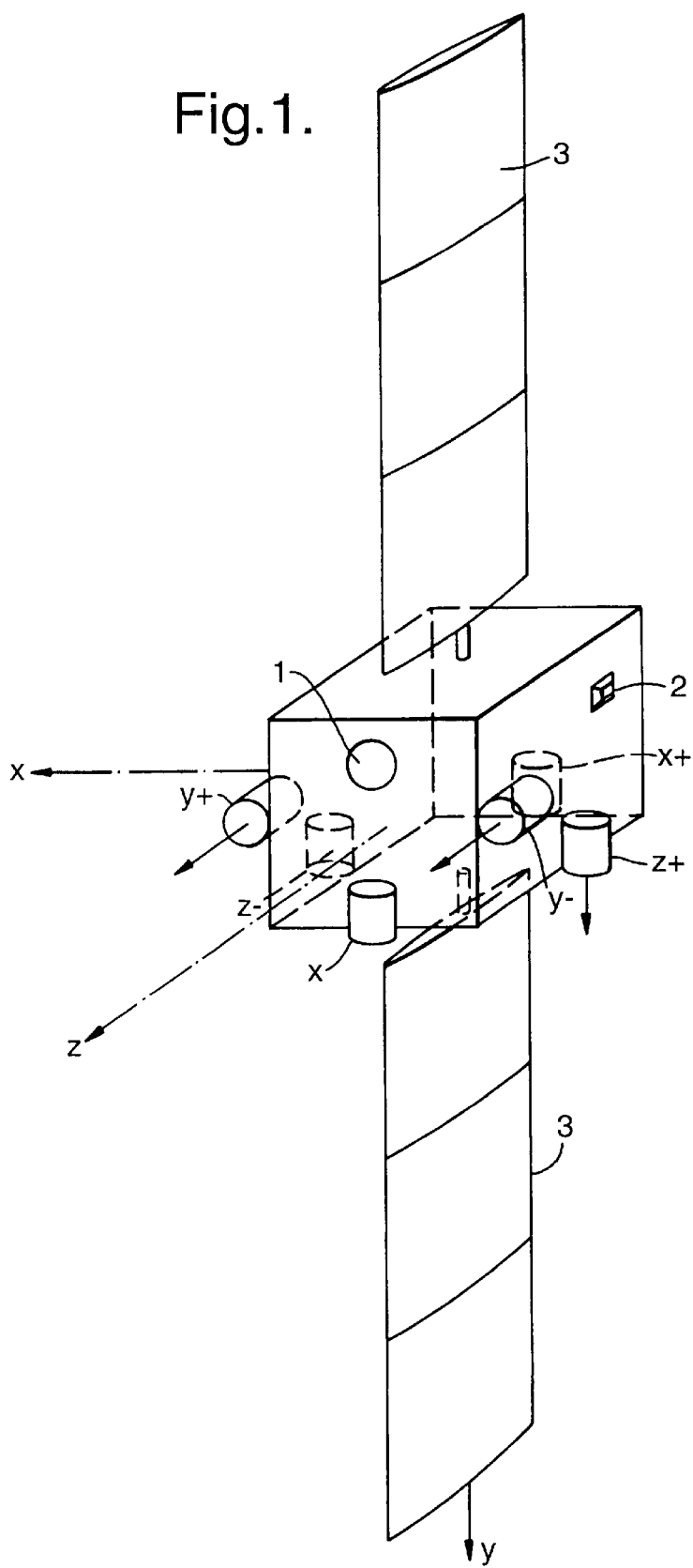
FIG. 1 is a schematic illustration of a satellite of a type suitable for control using the principles of the invention.
Figure 2:
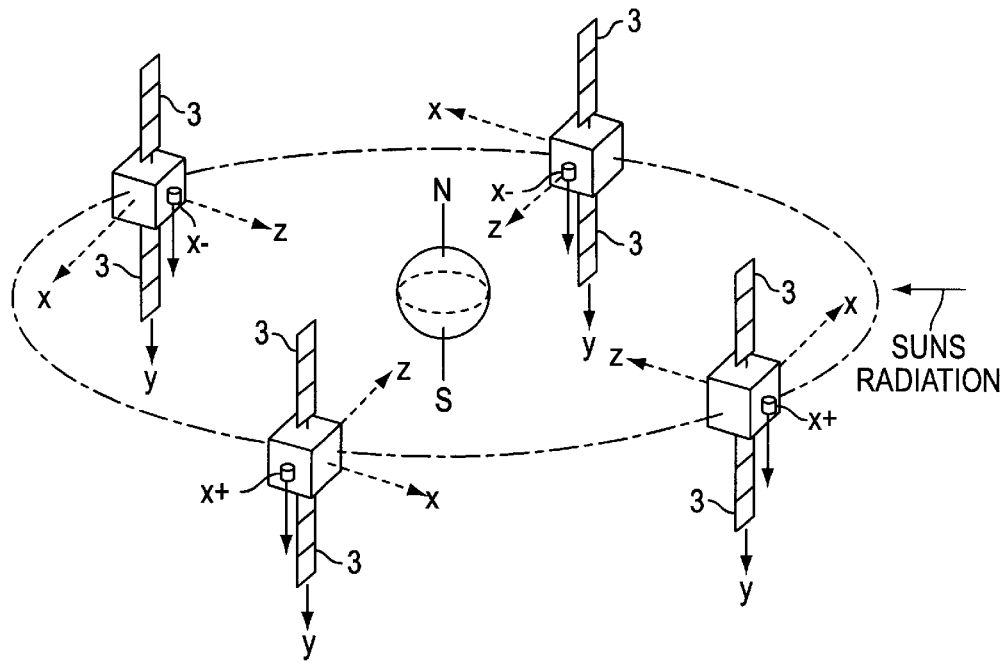
FIG. 2 shows the satellite of FIG. 1 in normal operation in a geostationary orbit about the earth.
Figure 3:
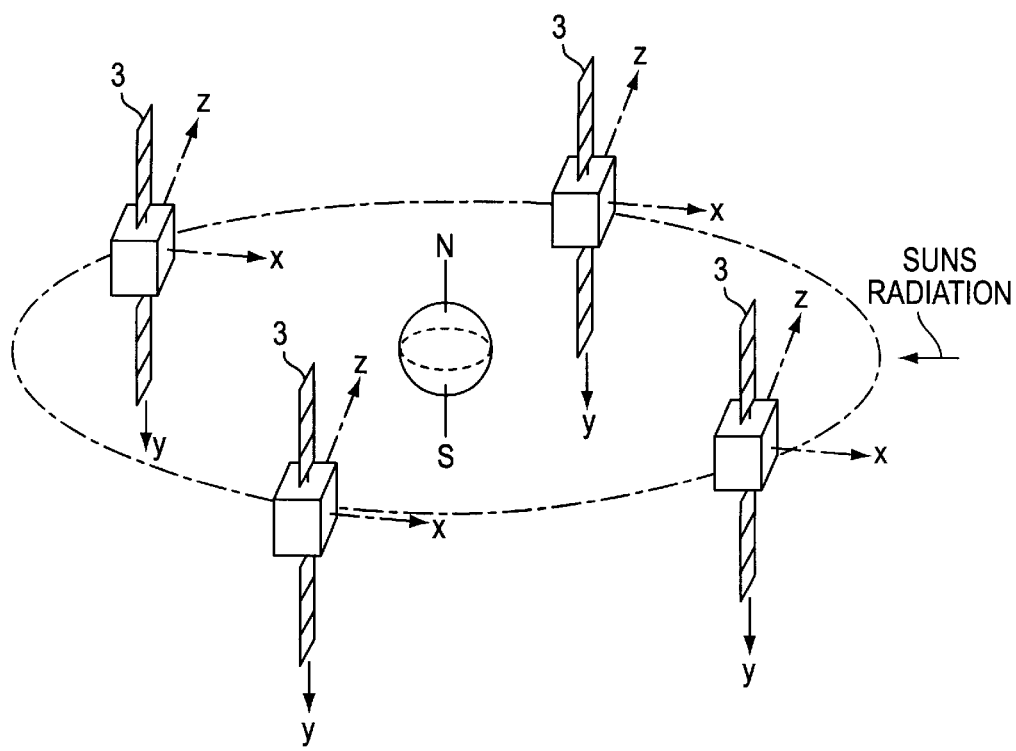
FIG. 3 shows the same satellite but in its "survival mode"
Figure 4A:
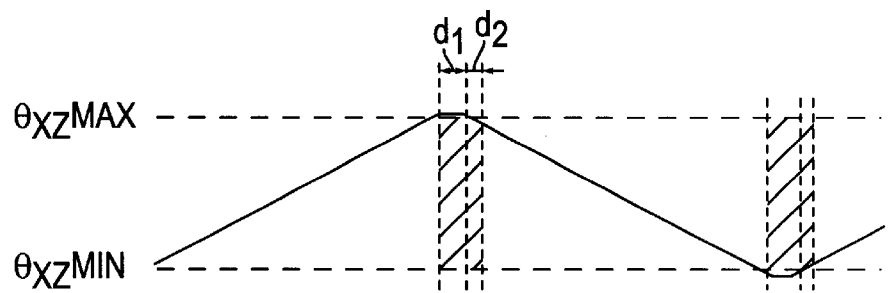
FIGS. 4A–4D show various types of characteristic movement of the axis of the satellite relative to the direction of the sun when it is in its survival mode.
Figure 4B:
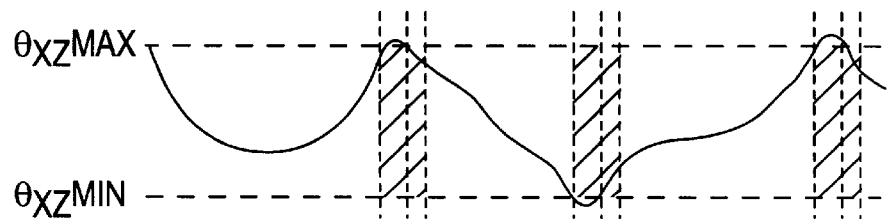
Figure 4C:
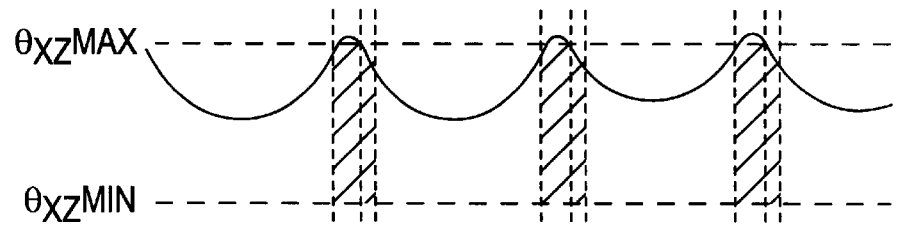
Figure 4D:
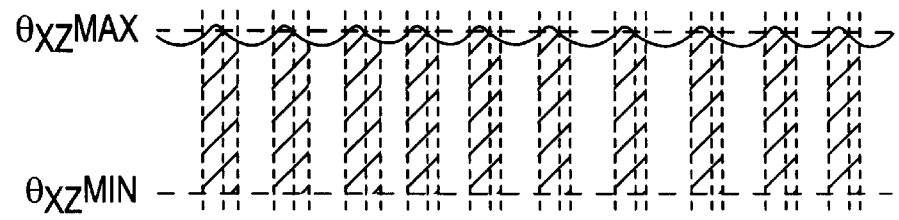

Once the limit cycle is as shown in FIG. 4B, the rate estimator gives accurate estimation and the rate around the sun direction is reduced. As the rate is reduced, the disturbance torque reduces also (since they are mainly due to gyroscopic coupling terms) and the adaptive control continues to adapt the parameters to this reduced rate. At the end the limit cycle tends to the limit cycle of FIG. 4A with low rates and a low consumption.

Because of the offset value added at 7 movement of the satellite is centred at an angle (typically 10°) from the sun's direction. For the reasons previously described this allows computer 11 (FIG. 5) to solve the equation 8 to give the value of $\omega_s$ to a high degree of accuracy. This value is then used by a controller 12 to control thrusters −X and +X in such a way as to reduce $\omega_s$ to zero.

Although the invention has been described with reference to a geostationary satellite in survival mode of operation in orbit around the earth it could be of use in other spacecraft which are required to be aligned with some reference source of radiation, either the sun or some other source. Also, whilst the invention has been described in terms of a method of preventing rotation about the x axis one can envisage situations in which it may be desired to produce a deliberate but controlled rotation and the invention may be used for that purpose.

What we claim:

1. Apparatus for controlling the rotation of a spacecraft about an axis (x) comprising sensing means for inspecting characteristics of relative movement between a frame of the spacecraft and the direction of a reference source of radiation; means for deriving from those characteristics an indication of rotation of the spacecraft about the x axis; and means for using the said indication to control the rotation.

2. Apparatus according to claim 1 in which the sensing means comprises a sun sensor whose output is related to the direction $\theta$ of the sun relative to the x axis.

3. Apparatus according to claim 2 in which the sensing means includes means for deriving the derivative and second derivative with respect to time of the direction $\theta$.

4. Apparatus according to claim 3 in which the sensing means includes means for solving the equation:

$$\dot{\vec{\omega}}=I^{-1}(\omega_S^2\vec{IS}\times\vec{S}+\omega_S(\vec{I\omega_0}\times\vec{S}+\vec{IS}\times\vec{\omega_0})+(\vec{I\omega_0}\times\vec{\omega_0})$$

$$\vec{\omega}=\omega_S^2\vec{x}_2+\omega_S\vec{x}_1+\vec{x}_0$$

$$\ddot{\vec{S}}=\vec{a}\omega_S^2+\vec{b}\omega_S+\vec{c}=\begin{vmatrix}-\\a_y\omega_S^2+b_y\omega_S+c_y\\a_z\omega_S^2+b_z\omega_S+c_z\end{vmatrix}$$

where: $\vec{S}$ is the sun's vector relative to the spacecraft frame
$\vec{\omega}$ is the rotation vector of the spacecraft frame $$\vec{a}=\vec{S}\times\vec{x}_2$$

$$\vec{b}=\vec{S}\times\vec{x}_1+\vec{\omega}_0$$

$$\vec{c}=\vec{S}\times\vec{x}_0+\dot{\vec{S}}\times\vec{\omega}_0$$

to give the value of $\vec{\omega}_s$.

5. Apparatus according to claim 4 including means for aligning the x axis of the spacecraft with an offset relative to the direction of the reference source.

6. Apparatus according to claim 5 comprising means for observing movement of the x axis of the spacecraft relative to the direction of the reference source and means for controlling thrusters on the spacecraft so as to cause the x axis to oscillate about the said offset direction.

7. Apparatus according to claim 6 in which the means for controlling the thrusters is designed to control the period of firing and the periods between firings of the thrusters so as to facilitate the process of observing the movement.

* * * * *